United States Patent
Ban et al.

(10) Patent No.: US 12,393,301 B2
(45) Date of Patent: Aug. 19, 2025

(54) TOUCH PANEL, DRIVING METHOD THEREOF, AND ELECTRONIC TERMINAL

(71) Applicants: Huizhou China Star Optoelectronics Display Co., Ltd., Guangdong (CN); TCL China Star Optoelectronics Technology Co., Ltd., Shenzhen (CN)

(72) Inventors: Youngil Ban, Guangdong (CN); Jinfeng Liu, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/269,773

(22) PCT Filed: Mar. 31, 2023

(86) PCT No.: PCT/CN2023/085708
§ 371 (c)(1),
(2) Date: Jun. 27, 2023

(87) PCT Pub. No.: WO2024/169005
PCT Pub. Date: Aug. 22, 2024

(65) Prior Publication Data
US 2025/0021186 A1    Jan. 16, 2025

(30) Foreign Application Priority Data
Feb. 17, 2023    (CN) .......... 202310145108.9

(51) Int. Cl.
*G06F 3/041* (2006.01)
*G06F 3/044* (2006.01)

(52) U.S. Cl.
CPC ...... *G06F 3/04166* (2019.05); *G06F 3/04164* (2019.05); *G06F 3/0446* (2019.05)

(58) Field of Classification Search
CPC ............ G06F 3/04164; G06F 3/04166; G06F 3/04161
See application file for complete search history.

(56) References Cited

U.S. PATENT DOCUMENTS

2009/0251434 A1   10/2009  Rimon et al.
2018/0329548 A1*  11/2018  Hamaguchi .......... G09G 3/3614
(Continued)

FOREIGN PATENT DOCUMENTS

CN    104503627 A    4/2015
CN    109254683 A    1/2019
(Continued)

OTHER PUBLICATIONS

International Search Report in International application No. PCT/CN2023/085708, mailed on Oct. 19, 2023.
(Continued)

*Primary Examiner* — Robin J Mishler
(74) *Attorney, Agent, or Firm* — PV IP PC; Wei Te Chung (57) ABSTRACT

A touch panel, a driving method thereof and an electronic terminal are provided. The touch panel includes a touch controller, a touch layer and a wiring layer. The touch layer includes a plurality of touch units that are spaced apart. The wiring layer includes a plurality of touch lines connected between the touch controller and the plurality of touch units, and a plurality of switches each connected to two corresponding touch lines such that when the switch is turned on, at least two corresponding touch units form a same touch area to transmit a touch signal to the touch controller.

9 Claims, 4 Drawing Sheets

(56) References Cited

U.S. PATENT DOCUMENTS

| | | | |
|---|---|---|---|
| 2022/0050576 A1* | 2/2022 | Jo ...................... | G06F 3/04164 |
| 2023/0113773 A1* | 4/2023 | Kim ................... | G06F 3/04166 |
| | | | 345/173 |
| 2023/0367413 A1* | 11/2023 | Gao ................... | G06F 3/04166 |

FOREIGN PATENT DOCUMENTS

| | | |
|---|---|---|
| CN | 110851018 A | 2/2020 |
| CN | 113050831 A | 6/2021 |
| CN | 114461094 A | 5/2022 |

OTHER PUBLICATIONS

Written Opinion of the International Search Authority in International application No. PCT/CN2023/085708, mailed on Oct. 19, 2023.

* cited by examiner

TOUCH PANEL, DRIVING METHOD THEREOF, AND ELECTRONIC TERMINAL

RELATED APPLICATIONS

This application is a National Phase of PCT Patent Application No. PCT/CN2023/085708 having International filing date of Mar. 31, 2023, which claims the benefit of priority of China Patent Application No. 202310145108.9 filed on Feb. 17, 2023. The contents of the above applications are all incorporated by reference as if fully set forth herein in their entirety.

TECHNICAL FIELD

The present application relates to display technologies, especially relates to display panel manufacturing technologies, and more particularly to a touch panel, a driving method thereof, and an electronic terminal.

BACKGROUND ARTS

Touch screens can achieve basic human-machine interaction functions without traditional data input systems such as buttons, keyboards or mice, among which capacitive touch screens are the most widely used touch screens.

There are "sensing points" all over the touch screen, and each "sensing point" is electrically connected to a corresponding touch controller. When the "sensing point" is pressed by an external object or even the external object gets close to the "sensing point", a change of capacitance at the "sensing point" causes a change of the amount of charges and that will be transmitted to the touch controller to identify whether the "sensing point" is touched. As the number of "sensing points" increases, the amount of data that the touch controller needs to process also increases. The power consumption of the touch controller has also increased.

Therefore, the existing touch screens have the problem of high power consumption of the touch controller, which urgently needs to be improved.

SUMMARY

Technical Problems

The embodiments of the present application provide a touch panel, a driving method thereof and an electronic terminal, for solving the technical problem of high power consumption of a touch controller in the existing touch screens.

Technical Solutions

An embodiment of the present application provides a touch panel, including:
a touch controller;
a touch layer, including a plurality of touch units that are spaced apart; and
a wiring layer, including a plurality of touch lines connected between the touch controller and corresponding touch units,
wherein the touch panel further includes a plurality of switches each connected to two corresponding touch lines such that when the switch is turned on, at least two corresponding touch units form a same touch area to transmit a touch signal to the touch controller.

BENEFICIAL EFFECTS

The touch panel, the driving method thereof and the electronic terminal provided in the embodiments of the present application include a touch controller; a touch layer, including a plurality of touch units that are spaced apart; and a wiring layer, including a plurality of touch lines connected between the touch controller and corresponding touch units. The present application deploys a switch connected between two touch lines so that when the switch is turned on, two corresponding touch units transmit a same touch signal to the touch controller. In such a way, two signals transmitted by at least two touch units connected to the switched-on switch will be neutralized to form the final "same touch signal" as mentioned above, thereby reducing the number of signals received by the touch controller from the touch layer, and this can reduce the power consumption of the touch controller.

DESCRIPTION OF DRAWINGS

The technical solutions and other beneficial effects of the present application will be more apparent with reference to the detailed descriptions of the embodiments of the present application below in accompanying with the drawings.

DESCRIPTION OF EMBODIMENTS OF THE DISCLOSURE

The technical solutions in the embodiments of the present application will be clearly and incessantly described below with reference to appended drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope of the present application.

In the description of the present application, it is to be understood that the orientation or positional relationship indicated by the terms "arrangement", "extension", "row", "column", and the like are based on the relationship of the position or orientation shown in the drawings, which is only for the purpose of facilitating description of the present application and simplifying the description, but is not intended to or implied that the device or element referred to must have a specific orientation, and be constructed and operated in a particular orientation. Therefore, it should not be construed as a limitation of the present disclosure. In addition, the terms "first" and "second" are used for descriptive purposes only and should not be taken to indicate or imply relative importance, or implicitly indicate the indicated number of technical features. Thus, by defining a feature with "first" or "second", it may explicitly or implicitly include one or more features. In the description of the present application, "a plurality" means two or more unless explicitly defined.

The term "embodiment" or "implementation" referred to herein means that a particular feature, structure or property described in conjunction with the embodiment may be contained in at least one embodiment of the present application. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The embodiments of the present invention provide a touch panel, which includes, but is not limited to, the following embodiments and any combination of the following embodiments.

Figure 1:
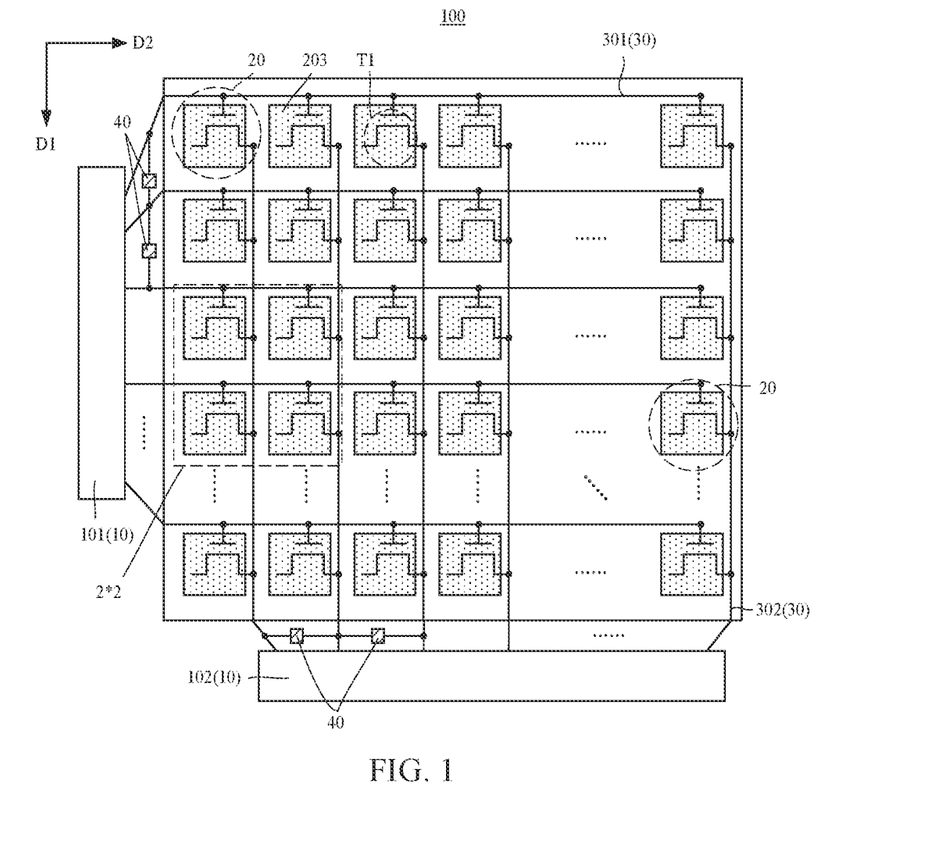
FIGS. 1 to 3 are schematic top views of a touch layer in three types of touch panels provided in embodiments of the present application.
Figure 2:
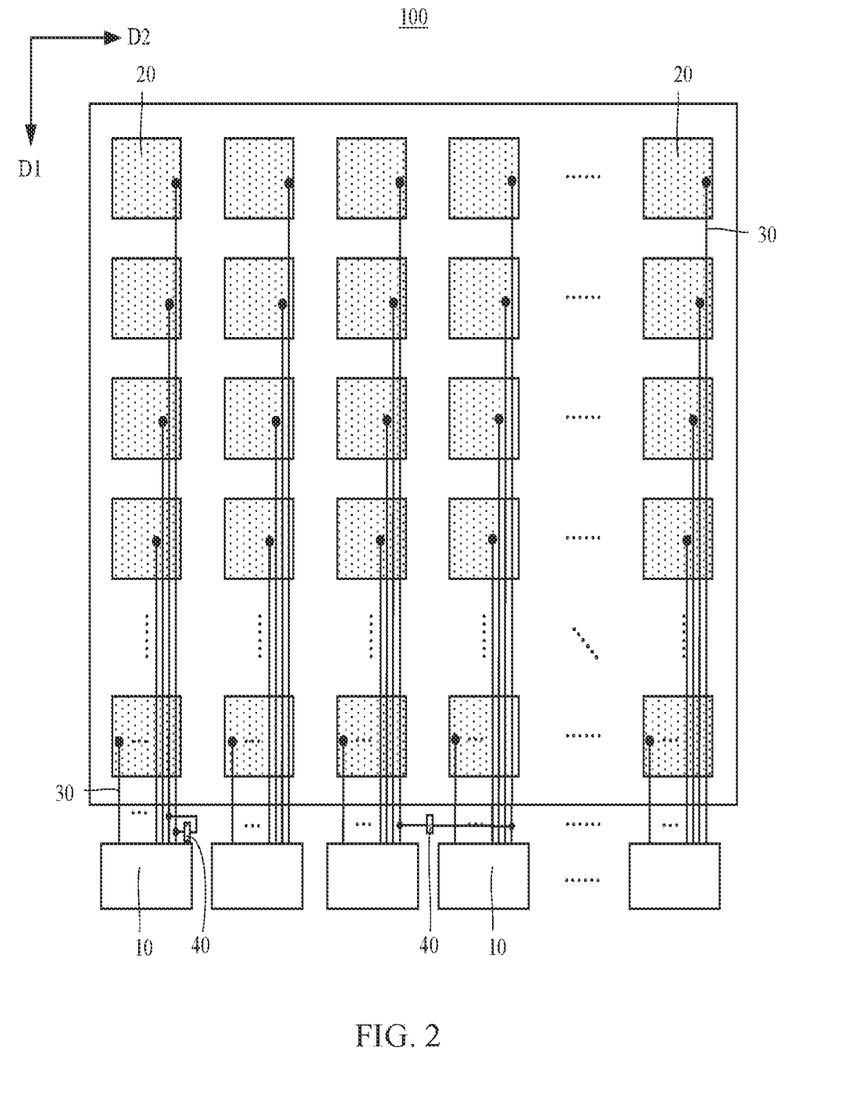
Figure 3:
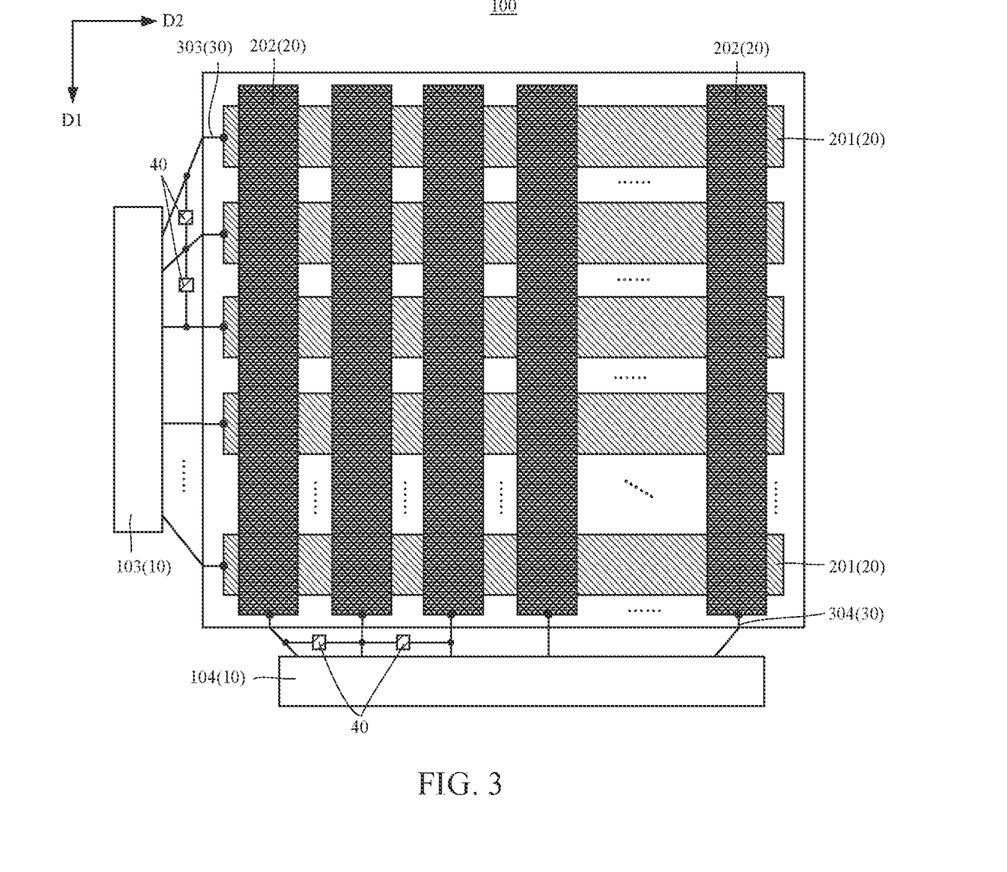

In an embodiment, as shown in FIGS. 1 to 3, a touch panel 100 includes a touch controller 10; a touch layer, including a plurality of touch units 20 that are spaced apart; and a wiring layer, including a plurality of touch lines 30 connected between the touch controller 10 and corresponding touch units 20, wherein the touch panel 100 further includes a plurality of switches 40 each connected to two corresponding touch lines 30 such that when the switch 40 is turned on, at least two corresponding touch units 20 form a same touch area to transmit a touch signal to the touch controller 10. The touch signals transmitted from at least two touch units 20 in a same touch area to the touch controller 10 may be the same or identical.

In the present embodiment, as shown in FIG. 1 to FIG. 3, the touch controllers 10 are not limited to their types and quantity, the touch units 20 are not limited to their arrangements and types, and the types of the touch lines 30 and their correspondence and connection relationship with the touch units 20 are also not limited. Specifically, in the present embodiment, the touch lines 30 are connected between the touch controller 10 and corresponding touch units 20. The touch line 30 may correspond to and connect to at least one touch unit 20, and communication between the touch controller 10 and the at least one corresponding touch unit 20 can be maintained.

It should be noted that in combination with the above discussion, there may be at least one of the following two situations in view of the connection of the touch lines 30. The first one is that the touch controller 10 may transmit signals to corresponding touch units 20, and the second one is that the touch units 20 may transmit corresponding signals to the touch controller 10. Further, in this embodiment, a switch 40 is provided between two touch lines 30 so that when the switch 40 is turned on, two corresponding adjacent touch units 20 transmit a same signal to the touch controller 10, that is, In this embodiment there are at least two touch lines 30 that meet the requirement of the afore-mentioned "switch" for transmitting the signal to the touch controller 10. Of course, in this embodiment, it is not limited whether there are touch units 20 that may receive signals transmitted by the touch controller 10.

It can be understood that in the present embodiment, the switch 40 is provided between two touch lines 30 corresponding to two adjacent touch units 20 for transmitting signals to the touch controller 10 so that at least at the time the switch is turned on, the two touch units 20 transmit a same signal to the touch controller 10. Compared to the two touch units 20 transmitting respective signals to the touch controller 10 for processing the signals separately in a case that the switch 40 is not provided, it can be considered that the two signals transmitted by at least two adjacent touch units 20 connected to the switched-on switch 40 will be neutralized to form the final "same signal" as mentioned above, thereby reducing the number of signals received by the touch controller 10 from the touch layer, and this can reduce the power consumption of the touch controller 10.

In an embodiment, as shown in FIG. 1, the touch controller 10 includes a touch scan controller 101 and a touch read controller 102; the plurality of touch lines 30 include a plurality of touch scan lines 301 and a plurality of touch read lines 302, the touch scanning lines 301 connecting to the touch scan controller 101 and corresponding touch units 20 and the touch read lines 302 connecting to the touch read controller 102 and corresponding touch units 20; each of the touch scan lines 301 transmitting a corresponding touch scan signal to the corresponding touch unit 20 to control the touch read controller 102 to be electrically connected to the corresponding touch units 20, wherein the switch 40 is connected between at least one of two of the touch scan lines 301 or two of the touch read lines 302.

As discussed above with respect to FIG. 1, the touch panel 100 in this embodiment can implement touch control in an active manner. The touch scan line 301 is connected between the touch scan controller 101 and corresponding touch units 20. The touch scan controller 101 may include, but not limited to, a plurality of touch scan units that correspond to the plurality of touch scan lines 301 respectively, and are arranged in a cascaded fashion. The plurality of touch scan units are configured to generate corresponding touch scan signals which are transmitted to corresponding touch scan lines 301 to control the positions of the touch units 20 corresponding to a plurality of touch read signals read by the touch read controller 102 at the time. The touch read controller 102 may be a single chip.

Based on the above discussion, in this embodiment, the switch 40 is connected between at least one of two touch scan lines 301 or two touch read lines 302. Herein, it is illustrated by a plurality of touch units 20 arranged along a row direction and a column direction.

When the switch 40 is connected between two touch scan lines 301, the two corresponding touch scan lines 301 may transmit a same touch scan signal to two corresponding rows of touch units 20, respectively, and during an effective time period of the touch scan signal, for two adjacent touch units 20 located along the column direction and connected to a same touch read line 302, what is read from the touch read line 302 is also the final "same signal" mentioned above, which is formed by neutralizing, via the touch read line 302, two touch read signals generated by the two touch units 20, respectively.

When the switch 40 is connected between two touch read lines 302, for the touch units 20 corresponding to a touch scan signal within an effective time period, for two adjacent touch units 20 located along the row direction and corresponding to two touch read lines 302 that are electrically connected to each other via the switch 40, what is read from the two touch read lines 302 is also the final "same signal" mentioned above, which is formed by neutralizing, via the two touch read lines 302, two touch read signals generated by the two touch units 20, respectively.

Therefore, the present embodiment can reduce the number of touch read signals received by the touch controller 10 from the touch layer, and this can reduce the power consumption of the touch controller 10.

Figure 4:
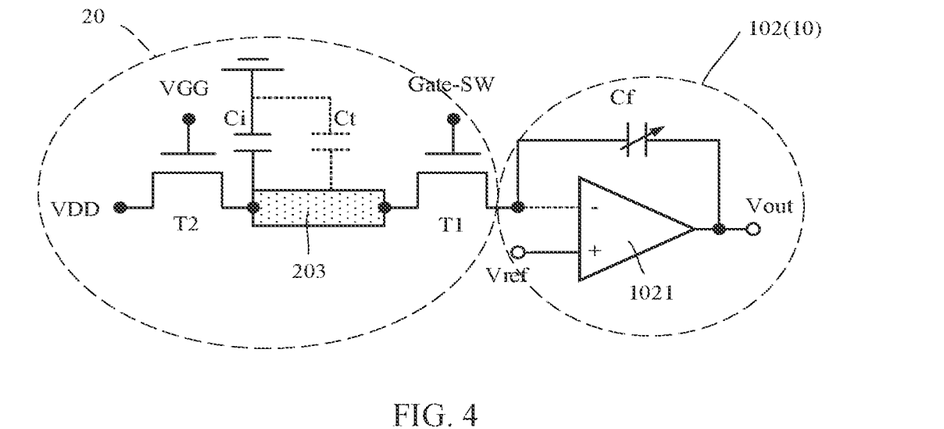
FIG. 4 is a schematic diagram illustrating the connection between a touch unit and a touch read controller in a touch panel corresponding to FIG. 1 provided in an embodiment of the present application.

In an embodiment, as shown in FIG. 1 and FIG. 4, the touch unit 20 includes a touch drive circuit and a touch electrode 203, and the touch drive circuit 204 includes a switch transistor T1, wherein each of the touch scan lines 301 is electrically connected to a gate of a corresponding switch transistor T1, each of the touch read lines 302 is electrically connected to one of a source or a drain of the corresponding switch transistor T1, and the other one of the source or the drain of the switch transistor T1 is electrically connected to a corresponding touch electrode.

Specifically, in combination with the above discussion, the touch scan line 301 is electrically connected to the gates of corresponding switch transistors T1, and the sources and drains of the switch transistors T1 are electrically connected to corresponding touch electrodes 203 and corresponding touch read lines 302, respectively, or vice versa. Accordingly, it can be considered that within an effective time period of the touch scan signal, a plurality of corresponding switch transistors T1 can be controlled to be turned on so as to control a plurality of corresponding touch electrodes 203 to be electrically connected to a plurality of corresponding touch read lines 302, thereby transmitting a plurality of corresponding touch read signals to the touch read controller 102 via a plurality of corresponding touch read lines 302.

Further, as shown in FIG. 4, the touch drive circuit in the touch unit 20 may further include a leakage transistor T2. The gate of the leakage transistor T2 may be loaded with a first voltage signal VGG, and one of the source or the drain of the leakage transistor T2 can be loaded with a second voltage signal VDD, and the other one of the source or the drain of the leakage transistor T2 can be electrically connected to a corresponding touch electrode 203. A first capacitor Ci will be formed between the touch electrode 203 and the ground. When the touch panel 100 is to implement the touch function, the first voltage signal VGG can first control the leakage transistor T2 to turn on so that a current generated by the second voltage signal VDD also flows into "the other one of the source or the drain of the leakage transistor T2" so that there is a corresponding amount of charges on one electrode plate (i.e., the touch electrode 203) of the first capacitor Ci. Then, the leakage transistor T2 can be controlled to turn off by the first voltage signal VGG to make the voltage of "the other one of the source or the drain of the leakage transistor T2" (i.e., the touch electrode 203) remain unchanged.

It can be understood that when an external object approaches the touch panel 100, a second capacitance Ct will also be formed between the external object and the touch electrode 203, resulting in a change of the capacitance, where the touch electrode 203 participates in formation of the capacitance. The voltage on the touch electrode 203 is unchanged, but the amount of charges on the touch electrode 203 does change. Further, when the capacitance of the second capacitor Ct formed between the external object and the touch electrode 203 meets a certain range, it can be realized that the amount of change of the capacitance on the touch electrode 203 meets a certain range, so that when a touch scan signal Gate-SW controls a corresponding switch transistor T1 to turn on, the touch read controller 102 can convert and analyze "the amount of change of charges" obtained by the touch read line 302 to determine whether a touch occurs and where the touch occurs.

Further, as shown in FIG. 4, the touch read controller 102 may at least include an operational amplifier 1021 and a variable capacitor Cf, and the source or the drain of the switch transistor T1 electrically connected to the corresponding touch read line 302 can be electrically connected to an inverting input terminal of the operational amplifier 1021. Of course, in combination with the above discussion, there may be a process module connected between "the source or the drain of the switch transistor T1 electrically connected to the corresponding touch read line 302" and "the inverting input terminal of the operational amplifier 1021" so as to convert "the amount of change of charges" obtained by the touch read line 302 to obtain a corresponding voltage, for example, loaded to "the inverting input terminal of the operational amplifier 1021". In combination with a reference voltage Vref loaded by a non-inverting input terminal of the operational amplifier 1021, an output terminal Vout of the operational amplifier 1021 can output a corresponding signal to indicate whether a touch occurs.

In an embodiment, as shown in FIG. 2, a plurality of touch lines 30 correspond to a plurality of touch units 20 in a one-to-one correspondence, and each of the touch lines 30 is connected to the touch controller 10 and a corresponding touch unit 20. The plurality of touch units 20 can be disposed in the same layer. In this embodiment, the relationship between the touch controller 10 and the touch lines 30 in quality is not limited. For example, as shown in FIG. 2, it is illustrated by a plurality of touch units 20 arranged in a row direction and a column direction. For example, a plurality of touch lines 30 connected to a plurality of touch units 20 in a same column can be electrically connected to a same touch controller 10. Meanwhile, it can be considered that the number of the touch controllers 10 is equal to the number of columns of touch units 20. Certainly, a plurality of touch lines 30 connected to a plurality of touch units 20 in a same row can be electrically connected to a same touch controller 10, and the number of touch controllers 10 can be set in the same way.

As discussed above with respect to FIG. 2, the touch panel 100 in this embodiment can implement touch control by way of self capacitance. The touch line 30 is connected between the touch controller 10 and the touch unit 20. The touch controller 10 can simultaneously transmit a plurality of corresponding touch drive signals to a plurality of touch units 20 via a plurality of touch lines 30. The touch unit 20 can transmit a touch feedback signal to a corresponding touch controller 10 via a corresponding touch line 30.

Based on the above discussion, in this embodiment, the switch 40 is connected between two touch lines 30, so that when the switch 40 is turned on, two corresponding adjacent touch units 20 transmit a same signal to the touch controller 10. Herein, it is illustrated by a plurality of touch units 20 arranged along a row direction and a column direction.

For example, the switch 40 may be disposed between two touch lines 30 corresponding to two adjacent touch units 20 and a same touch controller 10 (herein, the touch units 20 located in the first column and the first two rows are taken as an example). When the switch 40 is turned on, two touch feedback signals generated by the two touch units 20 respectively, can be neutralized through two corresponding touch lines 30 to form the final "same signal" as mentioned above, to reduce the number of touch feedback signals received by a corresponding touch controller 10 from the touch layer, and this can reduce the power consumption of the touch controller 10.

For another example, the switch 40 may be disposed between two touch lines 30 corresponding to two adjacent touch units 20 corresponding to two touch controllers 10 (herein, the touch units 20 located in the first row and the third and fourth columns are taken as an example). When the switch 40 is turned on, two touch feedback signals generated by the two touch units 20 respectively, can be neutralized through two corresponding touch lines 30 to form the final "same signal" as mentioned above, to transmit to one of the touch controllers 10 to reduce the number of touch feedback signals received by the other touch controller 10 from the touch layer, and this can reduce the power consumption of the touch controller 10.

In an embodiment, as shown in FIG. 3, the touch controller 10 includes a first touch controller 103 and a second touch controller 104; the plurality of touch units 20 include a plurality of first touch units 201 and a plurality of second touch units 202, and the first touch units 201 and the second touch units 202 are arranged crosswise; the plurality of touch lines 30 include a plurality of first touch lines 303 corresponding to the plurality of first touch units 201 and a plurality of second touch lines 304 corresponding to the plurality of second touch units 202, each of the first touch lines 303 is connected to the first touch controller 103 and a corresponding first touch unit 201, and each of the second touch lines 304 is connected to the second touch controller 104 and a corresponding second touch unit 202, wherein the switch 40 is connected between at least one of two of the first touch lines 303 or two of the second touch lines 304. At least one of the first touch controller 103 or the second touch controller 104 may be a single chip.

In this embodiment, the position of film layers of the first touch units 201 and the second touch units 202 are not limited. For example, as shown in FIG. 4, the first touch units 201 and the second touch units 202 may be disposed in different layers to achieve intersection and insulation. For another example, the first touch unit 201 may include a plurality of first touch parts arranged in a same layer as the second touch unit 202, and a first connection part arranged in a different layer from the second touch unit 202 and crossed with the second touch unit 202 for connecting two adjacent first touch parts. Further, for example, in FIG. 4, the plurality of first touch units 201 may extend along the row direction and be arranged along the column direction, and the plurality of second touch units 202 may extend along the column direction and be arranged along the row direction.

As discussed above with respect to FIG. 4, the touch panel 100 in this embodiment can implement touch control by way of mutual capacitance. The first touch line 303 is connected between the first touch controller 103 and the first touch unit 201, and the second touch line 304 is connected between the second touch controller 104 and the second touch unit 202. The first touch controller 103 may use a plurality of first touch lines 303 to transmit a plurality of corresponding touch drive signals to a plurality of first touch units 201, respectively. A plurality of second touch units 202 may use a plurality of second touch lines 304 to transmit corresponding touch feedback signals, respectively, to a corresponding second touch controller 104.

Based on the above discussion, in this embodiment, the switch 40 is connected between at least one of two first touch lines 303 or two second touch lines 304. Herein, it is illustrated by the arrangement of the first touch units 201 and the second touch units 202 in FIG. 4.

In a case that the switch 40 is connected between two first touch lines 303, when the switch 40 is turned on, within an effective time period of a touch scan signal, two corresponding first touch units 201 located in adjacent rows may receive a same touch drive signal, and a part of a plurality of second touch units 202 that intersects with the two first touch units 201 can start to effectively sense a touch. The charges on two parts of each second touch unit 202 that intersect with the two first touch units 201 may accumulate to be neutralized by the second touch units 202 themself, so as to generate the final "same signal" as mentioned above, thereby reducing the number of signals received by the first touch controller 103 from the touch layer, and this can reduce the power consumption of the first touch controller 103 of the touch controller 10.

In a case that the switch 40 is connected between two second touch lines 304, when the switch 40 is turned on, for two second touch units 202 located adjacent along the row direction and corresponding to a touch scan signal within an effective time period, the generated two touch feedback signals are neutralized via two second touch lines 304 that are electrically connected to each other to generate the final "same signal" as mentioned above, thereby reducing the number of signals received by the first touch controller 103 from the touch layer, and this can reduce the power consumption of the first touch controller 103 of the touch controller 10.

In an embodiment, as shown in FIG. 1 and FIG. 4, for the active manner to implement touch control, the plurality of touch units 20 form a plurality of first touch groups arranged along a first direction D1 and form a plurality of second touch groups arranged along a second direction D2; the plurality of touch units 20 in a same first touch group are all connected to a corresponding touch scan line 301, and the plurality of touch units 20 in a same second touch group are all connected to a corresponding touch read line 302; in k touch scan lines 301 corresponding to k first touch groups that are consecutively arranged, a corresponding switch 40 is connected between every two adjacent touch scan lines 301, and in k touch read lines 302 corresponding to k second touch groups that are consecutively arranged, a corresponding switch 40 is connected between every two adjacent touch read lines 302, where k is a positive integer.

In this embodiment, the first direction D1 and the second direction D2 are not limited. For ease of description, it is illustrated by taking the first direction D1 and the second direction D2 as the column direction and the row direction, respectively. Then, the first touch group can be understood or interpreted as the plurality of touch units 20 located in a same row, and the second touch group can be understood or interpreted as the plurality of touch units 20 located in a same column.

Specifically, in combination with the above discussion, it is further defined in this embodiment that when the switch 40 is turned on, every two among the k touch scan lines 301 corresponding to the k consecutively-arranged first touch groups (that is, consecutive k rows of the touch units 20) are electrically connected to each other, and every two among the k touch read lines 302 corresponding to the k consecutively-arranged second touch groups (that is, consecutive k columns of the touch units 20) are electrically connected to each other. That is, it can be realized that k*k touch read signals generated by corresponding k*k touch units 20 can be neutralized by the electrically-connected k touch read lines 302 to form the final "same touch signal" as mentioned above, and this can reduce the power consumption of the first touch controller 103 of the touch controller 10.

It can be understood that in this application, it is equivalent to modifying an original minimum identifiable touch point from a single touch unit 20 to multiple touch units 20 when the switch 40 is turned on. That is, in comparison, modifying the minimum identifiable touch point from single touch unit 20 is equivalent to sacrificing the accuracy of touch recognition. However, in this embodiment, it is further defined that the minimum identifiable touch points are "k*k touch units 20" when the switch 40 is turned on, that is, it ensures that the minimum identifiable touch point is still a square, so that the touch panel 100 has equal touch recognition accuracy in the row direction and the column direction, thereby improving the uniformity in touch recognition.

The specific value of k is not limited here. For example, when k is equal to 2, the minimum identifiable touch point is "2*2 touch units 20" when the switch 40 is turned on. A "2*2 touch units 20" in the second row and the first column is indicated in FIG. 1.

In an embodiment, as shown in FIG. 1 and FIG. 4, the touch layer includes: a first touch area, provided with i1 touch groups arranged along a first direction D1, and the touch group includes j1 touch units 20 arranged along a second direction D2, where i1 and j1 are positive integers; a second touch area, provided with i2 touch groups arranged along the first direction D1, and the touch group includes j2 touch units arranged along the second direction D2, where i2 and j2 are positive integers; the plurality of touch units 20 in a same touch group are all connected to a corresponding touch scan line 301, and the touch read line 302 is connected to one of the touch units 20 corresponding to each of the touch groups, wherein there may be at least one of the following two cases, the first case is that the i1 is not equal to the i2, and the second case is that the j1 is not equal to the j2.

Specifically, in combination with the above discussion, it can be considered that: when the plurality of switches 40 are all turned off, the plurality of touch units 20 form a plurality of first touch areas to transmit sub touch signals to the touch controller 10, respectively; when some of the plurality of switches 40 are turned on, the touch units 20 connected via the turned-on switches 40 form a plurality of second touch areas to transmit the touch signals to the touch controller 10, respectively; when the plurality of switches 40 are all turned on, the touch units 20 connected via the turned-on switches 40 form a plurality of third touch areas to transmit the touch signals to the controller 10, respectively, wherein the number of the touch units 20 in the first touch area is less than the number of the touch units 20 in the second touch area, and the number of the touch units 20 in the second touch area is less than the number of the touch units 20 in the third touch area.

It can be understood that in this embodiment, for the different first touch areas and second touch areas, differences are made for the number of touch units 20 in the minimum identifiable touch point when the switches 40 are turned on. That is, it is further defined that when the switches 40 are turned on for different touch areas, corresponding accuracy in touch recognition may be different. The above difference in number may be related to the distance between two touch areas, and when the switches 40 are turned on for different touch areas, in an example, when the switches 40 are turned on, the closer the touch area to a central area of the touch panel 100, the smaller the number of touch units 20 in the minimum identifiable touch point, so that a greater accuracy in touch recognition is yielded. The arrangement of the touch units 20 in the minimum identifiable touch point is not limited in this embodiment.

It should be noted that referring to the relevant description of the principle of touch technologies in FIG. 2 and FIG. 3, by arranging the switches, the two embodiments can also implement different configurations regarding the number and the arrangement of touch units 20 in the "minimum identifiable touch point" when the switches are turned on. For example, in FIG. 2, if every two of the k1*k2 touch lines 30 corresponding to the "consecutively-arranged k1*k2 touch units 20" are connected via the switches 40, the minimum identifiable touch point can be realized as "k1*k2 touch units 20". For another example, in FIG. 3, if every two of the k3*k4 touch lines 30 (i.e., k3 consecutively-arranged first touch lines 303 and k4 consecutively-arranged second touch lines 304) corresponding to the "consecutively-arranged k3*k4 touch units 20 (i.e., k3 consecutively-arranged rows of the first touch units 201 and k4 consecutively-arranged columns of the second touch units 202)" are connected via the switches 40, the minimum identifiable touch point can be realized as "k3*k4 touch units 20".

Figure 5:
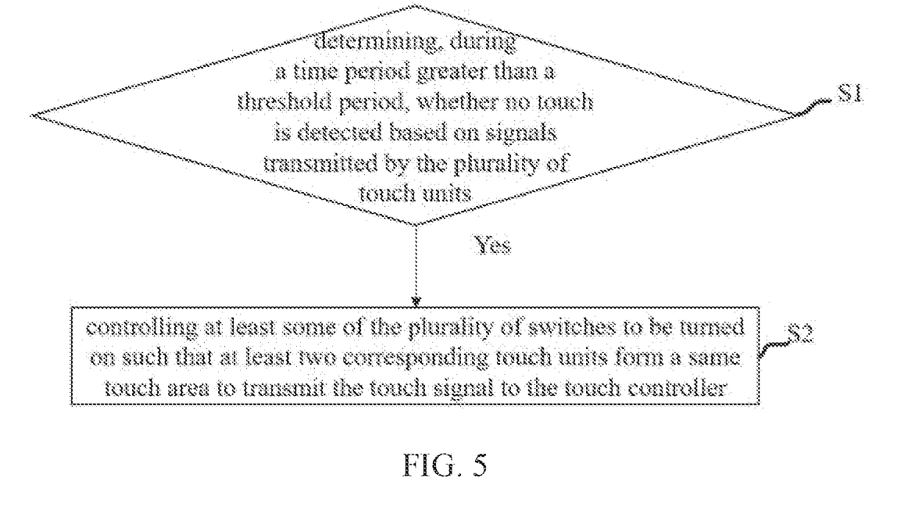
FIG. 5 is a flowchart of a driving method for a touch panel provided in an embodiment of the present application.

The embodiments of the present application provide a touch panel driving method, for driving the touch panel described in any one of above embodiments. As shown in FIG. 5, the method may include, but is not limited to, the following steps.

S1. determining, during a time period greater than a threshold period, whether no touch is detected based on signals transmitted by the plurality of touch units.

Specifically, after starting up, the switches 40 may be controlled to be turned off, so that at least two corresponding touch units 20 transmit two touch signals to the touch controller 10, respectively.

Based on the touch panel 100 discussed above, for example, as shown in FIGS. 2 to 4, after starting up the touch panel 100, the switches 40 are turned off such that touch recognition is performed using a single touch unit 20 as "the minimum identifiable touch point". That is, two adjacent touch units 20 correspondingly connected to the switch 40 can transmit signals to the touch controller 10, respectively, that is, each touch unit 20 can transmit a corresponding signal to a corresponding touch controller 10 via a corresponding touch line 30. The touch controller 10 needs to process the signal transmitted by each corresponding touch unit 20. By default, the touch recognition with the highest accuracy is performed first after power-on.

It can be considered that at least within the threshold period, the touch panel 100 performs the touch recognition with the highest accuracy.

If it is determined that no touch is detected, execute:

S2. controlling at least some of the plurality of switches to be turned on such that at least two corresponding touch units form a same touch area to transmit the touch signal to the touch controller.

Following the above discussion, if the touch controller determines that no touch is detected according to the signals transmitted by the plurality of touch units during the time period greater than the threshold period, it can be considered that the touch panel still does not detect a touch for a long time. It can be considered that there is a high probability that there is no external object close to the touch panel 100 at the time. Meanwhile, the switches 40 are turned on to realize that two corresponding touch lines 30 are electrically connected. In combination with the above discussion, the signals transmitted by two adjacent touch units 20 can be neutralized via the two electrically-connected touch lines 30, so that the touch signals eventually flowing into the touch controller 10 are a "same signal".

For the equivalent circuit shown in FIG. 4, it can be considered that the power P of the touch read controller 102 is equal to $\frac{1}{2}*(f*C*U^2)$, where C is the parasitic capacitance formed between the touch scan line 301 and other structures in the touch panel 100, U is the amplitude of an effective pulse in the touch scan signal transmitted by the touch scan line 301 within an effective time period, and f is the frequency of changes of the signals received by the touch read controller 102. That is, within a specific time period, since the effective pulses in the plurality of touch scan lines 301 have a same gap, it can be considered that the touch read controller 102 receives a plurality of corresponding touch read signals at a certain frequency.

Figure 6:
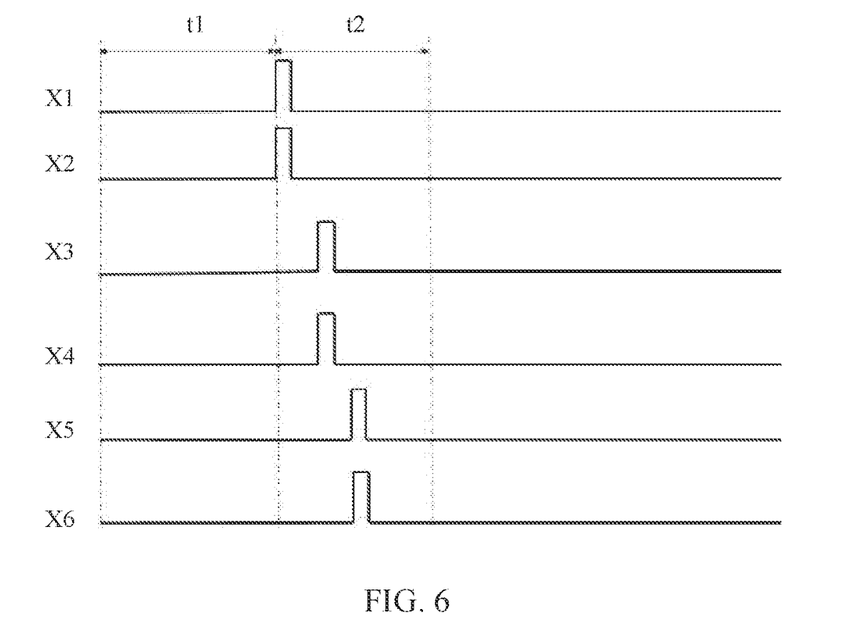
FIG. 6 is a waveform diagram of a plurality of touch scanning signals of a touch panel provided in an embodiment of the present application.

It can be understood that based on FIG. 1 with reference to FIGS. 6, X1 to X6 in FIG. 6 correspond to six touch scan signals transmitted by the first to sixth touch scan lines 301, respectively. Further, in combination with the above discussion, one switch 40 may be connected between the first and the second touch scan lines 301, one switch 40 may be connected between the third and the fourth touch scan lines 301, and one switch 40 may be connected between the fifth and the sixth touch scan lines 301. When the switches 40 are all turned on, the effective pulses of X1 and X2 are in the same time period, the effective pulses of X3 and X4 are in the same time period, and the effective pulses of X5 and X6 are in the same time period. In this manner, the switch transistors T1 in the first and second rows of touch units 20 are turned on at the same time. In combination with the above discussion, it can be seen that for a corresponding column of the touch units 20 in the first and the second rows that are connected to a same touch read line 302, what is read by the touch read line 302 is also the final "same signal" mentioned above, which is formed by neutralizing, via the touch read line 302, two touch read signals generated by the touch units 20, respectively, so that the number of touch read signals received by the touch read controller 102 and corresponding to one row of touch units 20 can be halved, thereby reducing the frequency f of changes of the signals received by the touch read controller 102, and this reduces the power P of the touch controller 10.

In an embodiment, Step S2 may include, but is not limited to, the following steps: controlling a first part of the plurality of switches to be turned on such that the touch units connected via the turned-on first part of switches form a plurality of first sub touch areas to transmit the touch signals to the touch controller, respectively; if determined, during the time period greater than the threshold period, that no touch is detected based on initial touch signals, controlling a second part of the plurality of switches to be turned on such that the touch units connected via the turned-on second part of switches form a plurality of second sub touch areas to transmit the touch signals to the touch controller, respectively, and the number of the touch units in the first sub touch area is less than the number of the touch units in the second sub touch area.

Specifically, in combination with the above discussion, it can be seen that each time it is determined that no touch is detected, the number of switches 40 that are currently turned on can be increased, and the power consumption of the touch controller 10 can be further reduced by further reducing the accuracy in touch recognition.

In an embodiment, after Step S2, the method may further include, but is not limited to, the following steps: If determined, during the time period greater than the threshold period, that a touch is detected according to initial touch signals, controlling the plurality of the switches to be turned off such that each of the touch units transmits a corresponding second touch signal to the touch controller.

Specifically, after Step S2, the way of "minimum identifiable touch point" equal to multiple touch units 20 (that is, with a lower accuracy of touch recognition) can be used for the touch recognition, and it can be determined at any time whether a touch is detected currently. Once a touch is detected, the switches are turned off, so that two corresponding adjacent touch units transmit signals respectively, that is, the touch recognition is recovered with the highest accuracy of touch recognition corresponding to the way of "minimum identifiable touch point" equal to a single touch unit 20.

Further, as shown in FIG. 6, when the switches 40 are turned on, each frame may include a display period t1 and a touch period t2. A plurality of rows of sub-pixels of the touch panel 100 may illuminate within the display period t1 and the screen is maintained during the touch period t2. Meanwhile, touch recognition can be performed during the touch period t2, and corresponding operations are performed based on different results of the touch recognition. For example, if it is determined that a touch is detected during the touch period t2 of each frame, a corresponding screen can be displayed in the display period t1 of a next frame based on the result of touch recognition in a previous frame. For example, "the result of touch recognition" is an action of drawing a line with a human finger, and then in the display period t1 of the next frame, a corresponding "line" can be displayed based on the position touched by the human finger.

The embodiments of the present application further provide an electronic terminal, which includes the touch panel described in any one of the above embodiments.

The touch panel, the driving method thereof and the electronic terminal provided in the embodiments of the present application include a touch controller; a touch layer, including a plurality of touch units that are spaced apart; and a wiring layer, including a plurality of touch lines connected between the touch controller and corresponding touch units. The present application deploys a switch connected between two touch lines so that when the switch is turned on, two corresponding touch units transmit a same touch signal to the touch controller. In such a way, two signals transmitted by at least two touch units connected to the switched-on switch will be neutralized to form the final "same touch signal" as mentioned above, thereby reducing the number of signals received by the touch controller from the touch layer, and this can reduce the power consumption of the touch controller.

Hereinbefore, the touch panel, the driving method thereof and the electronic terminal provided in the embodiments of the present application are introduced in detail, the principles and implementations of the embodiments are set forth herein with reference to specific examples, descriptions of the above embodiments are merely served to assist in understanding the technical solutions and essential ideas of the present application. Those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present application.

The invention claimed is:

1. A touch panel, comprising:
a touch controller;
a touch layer, comprising a plurality of touch units that are spaced apart; and
a wiring layer, comprising a plurality of touch lines connected between the touch controller and corresponding touch units,
wherein the touch panel further comprises a plurality of switches each connected to two corresponding touch lines such that when the switch is turned on, at least two corresponding touch units form a same touch area to transmit a touch signal to the touch controller;
wherein the touch controller comprises a touch scan controller and a touch read controller;
the plurality of touch lines comprise a plurality of touch scan lines and a plurality of touch read lines, the touch scanning lines connecting to the touch scan controller and corresponding touch units and the touch read lines connecting to the touch read controller and corresponding touch units;

each of the touch scan lines transmitting a corresponding touch scan signal to the corresponding touch unit to control the touch read controller to be electrically connected to the corresponding touch units, wherein the switch is connected between at least one of two of the touch scan lines or two of the touch read lines;

wherein the touch unit comprises a touch drive circuit and a touch electrode, and the touch drive circuit comprises a switch transistor, wherein each of the touch scan lines is electrically connected to a gate of a corresponding switch transistor, each of the touch read lines is electrically connected to one of a source or a drain of the corresponding switch transistor, and the other one of the source or the drain of the switch transistor is electrically connected to a corresponding touch electrode;

wherein the touch drive circuit further comprises a leakage transistor, and wherein a gate of the leakage transistor is configured to be loaded with a first voltage signal, one of a source and a drain loaded of the leakage transistor is configured to be loaded with a second voltage signal, and the other one of the source and the drain of the leakage transistor is connected to the corresponding touch electrode.

2. The touch panel of claim 1, wherein the plurality of touch units form a plurality of first touch groups arranged along a first direction and form a plurality of second touch groups arranged along a second direction;

the plurality of touch units in a same first touch group are all connected to a corresponding touch scan line, and the plurality of touch units in a same second touch group are all connected to a corresponding touch read line;

in k touch scan lines corresponding to k first touch groups that are consecutively arranged, a corresponding switch is connected between every two adjacent touch scan lines, and in k touch read lines corresponding to k second touch groups that are consecutively arranged, a corresponding switch is connected between every two adjacent touch read lines, where k is a positive integer.

3. The touch panel of claim 1, wherein:

when the plurality of switches are all turned off, the plurality of touch units form a plurality of first touch areas to transmit sub touch signals to the touch controller, respectively;

when some of the plurality of switches are turned on, the touch units connected via the turned-on switches form a plurality of second touch areas to transmit the touch signals to the touch controller, respectively;

when the plurality of switches are all turned on, the touch units connected via the turned-on switches form a plurality of third touch areas to transmit the touch signals to the controller, respectively, wherein the number of the touch units in the first touch area is less than the number of the touch units in the second touch area, and the number of the touch units in the second touch area is less than the number of the touch units in the third touch area.

4. A touch panel driving method, for driving the touch panel according to claim 1, comprising:

if determined, during a time period greater than a threshold period, that no touch is detected based on first touch signals transmitted by the plurality of touch units, controlling at least some of the plurality of switches to be turned on such that at least two corresponding touch units form the same touch area to transmit the touch signal to the touch controller.

5. The touch panel driving method of claim 4, further comprising:

if determined, during the time period greater than the threshold period, that a touch is detected according to initial touch signals, controlling the plurality of the switches to be turned off such that each of the touch units transmits a corresponding second touch signal to the touch controller.

6. The touch panel driving method of claim 4, wherein the step of controlling at least some of the plurality of switches to be turned on such that at least two corresponding touch units form the same touch area to transmit the touch signal to the touch controller comprises:

controlling a first part of the plurality of switches to be turned on such that the touch units connected via the turned-on first part of switches form a plurality of first sub touch areas to transmit the touch signals to the touch controller, respectively;

if determined, during the time period greater than the threshold period, that no touch is detected based on initial touch signals, controlling a second part of the plurality of switches to be turned on such that the touch units connected via the turned-on second part of switches form a plurality of second sub touch areas to transmit the touch signals to the touch controller, respectively, and the number of the touch units in the first sub touch area is less than the number of the touch units in the second sub touch area.

7. An electronic terminal, comprising a touch panel, the touch panel comprising:

a touch controller;

a touch layer, comprising a plurality of touch units that are spaced apart; and a wiring layer, comprising a plurality of touch lines connected between the touch controller and corresponding touch units, wherein the touch panel further comprises a plurality of switches each connected to two corresponding touch lines such that when the switch is turned on, at least two corresponding touch units form a same touch area to transmit a touch signal to the touch controller;

wherein the touch controller comprises a touch scan controller and a touch read controller;

the plurality of touch lines comprise a plurality of touch scan lines and a plurality of touch read lines, the touch scanning lines connecting to the touch scan controller and corresponding touch units and the touch read lines connecting to the touch read controller and corresponding touch units;

each of the touch scan lines transmitting a corresponding touch scan signal to the corresponding touch unit to control the touch read controller to be electrically connected to the corresponding touch units, wherein the switch is connected between at least one of two of the touch scan lines or two of the touch read lines;

wherein the touch unit comprises a touch drive circuit and a touch electrode, and the touch drive circuit comprises a switch transistor, wherein each of the touch scan lines is electrically connected to a gate of a corresponding switch transistor, each of the touch read lines is electrically connected to one of a source or a drain of the corresponding switch transistor, and the other one of the source or the drain of the switch transistor is electrically connected to a corresponding touch electrode;

wherein the touch drive circuit further comprises a leakage transistor, and wherein a gate of the leakage transistor is configured to be loaded with a first voltage signal, one of a source and a drain loaded of the leakage transistor is configured to be loaded with a second voltage signal, and the other one of the source and the drain of the leakage transistor is connected to the corresponding touch electrode.

8. The electronic terminal of claim 7, wherein the plurality of touch units form a plurality of first touch groups arranged along a first direction and form a plurality of second touch groups arranged along a second direction;

the plurality of touch units in a same first touch group are all connected to a corresponding touch scan line, and the plurality of touch units in a same second touch group are all connected to a corresponding touch read line;

in k touch scan lines corresponding to k first touch groups that are consecutively arranged, a corresponding switch is connected between every two adjacent touch scan lines, and in k touch read lines corresponding to k second touch groups that are consecutively arranged, a corresponding switch is connected between every two adjacent touch read lines, where k is a positive integer.

9. The electronic terminal of claim 7, wherein:

when the plurality of switches are all turned off, the plurality of touch units form a plurality of first touch areas to transmit sub touch signals to the touch controller, respectively;

when some of the plurality of switches are turned on, the touch units connected via the turned-on switches form a plurality of second touch areas to transmit the touch signals to the touch controller, respectively;

when the plurality of switches are all turned on, the touch units connected via the turned-on switches form a plurality of third touch areas to transmit the touch signals to the controller, respectively, wherein the number of the touch units in the first touch area is less than the number of the touch units in the second touch area, and the number of the touch units in the second touch area is less than the number of the touch units in the third touch area.

* * * * *